United States Patent [19]

Ligon, Sr. et al.

[11] Patent Number: 5,681,005
[45] Date of Patent: Oct. 28, 1997

[54] LEVER ACTUATOR

[75] Inventors: James T. Ligon, Sr., Almont; Stephen P. Porter, Imlay City; Andrew L. Patrius, Jr., Attica, all of Mich.

[73] Assignee: Ligon Brothers Manufacturing Company, Almont, Mich.

[21] Appl. No.: 515,186

[22] Filed: Aug. 11, 1995

[51] Int. Cl.$^6$ ................................ B65H 75/30
[52] U.S. Cl. .............. 242/394.1; 242/395; 242/396.6; 192/8 C; 192/17 D; 254/222; 254/370
[58] Field of Search .................. 242/394, 394.1, 242/395, 396.6; 254/222, 223, 242, 347, 350, 355, 356, 366, 368, 370; 192/8 C, 8 R, 12 BA, 17 D

[56] References Cited

U.S. PATENT DOCUMENTS

| 823,971 | 6/1906 | Remondy | 192/8 C |
|---|---|---|---|
| 3,726,370 | 4/1973 | Hubbard | 192/8 C |
| 3,759,358 | 9/1973 | Quenneville | 192/8 C |
| 3,796,292 | 3/1974 | Harrison | 192/8 C |
| 3,876,184 | 4/1975 | Eudy | 192/12 BA |
| 4,014,422 | 3/1977 | Morishita | |
| 4,494,709 | 1/1985 | Takada | |
| 4,561,606 | 12/1985 | Sakakibara et al. | |
| 4,614,257 | 9/1986 | Harada et al. | 192/8 C |
| 4,778,138 | 10/1988 | Yamada | 192/8 C |
| 4,786,110 | 11/1988 | Mahling | 192/8 C |
| 4,817,771 | 4/1989 | Iten | 192/17 D |
| 5,186,412 | 2/1993 | Park | |
| 5,211,368 | 5/1993 | Kitamura | 192/8 C |
| 5,382,076 | 1/1995 | Scheck et al. | |

*Primary Examiner*—John M. Jillions
*Attorney, Agent, or Firm*—Dykema Gossett PLLC

[57] ABSTRACT

Lever actuator assembly includes the use of at least one clutch member for providing selective adjustment of the length or tension of a cable. The clutch member provides for a stationary position of a item such as a cable relative to the assembly housing absent any rotational force. Applying a rotational force in a selected manner results in an adjustment through movement of the clutch member relative to the housing. A disclosed embodiment is particularly useful for applications that require adjusting a relative length of a cable.

13 Claims, 3 Drawing Sheets

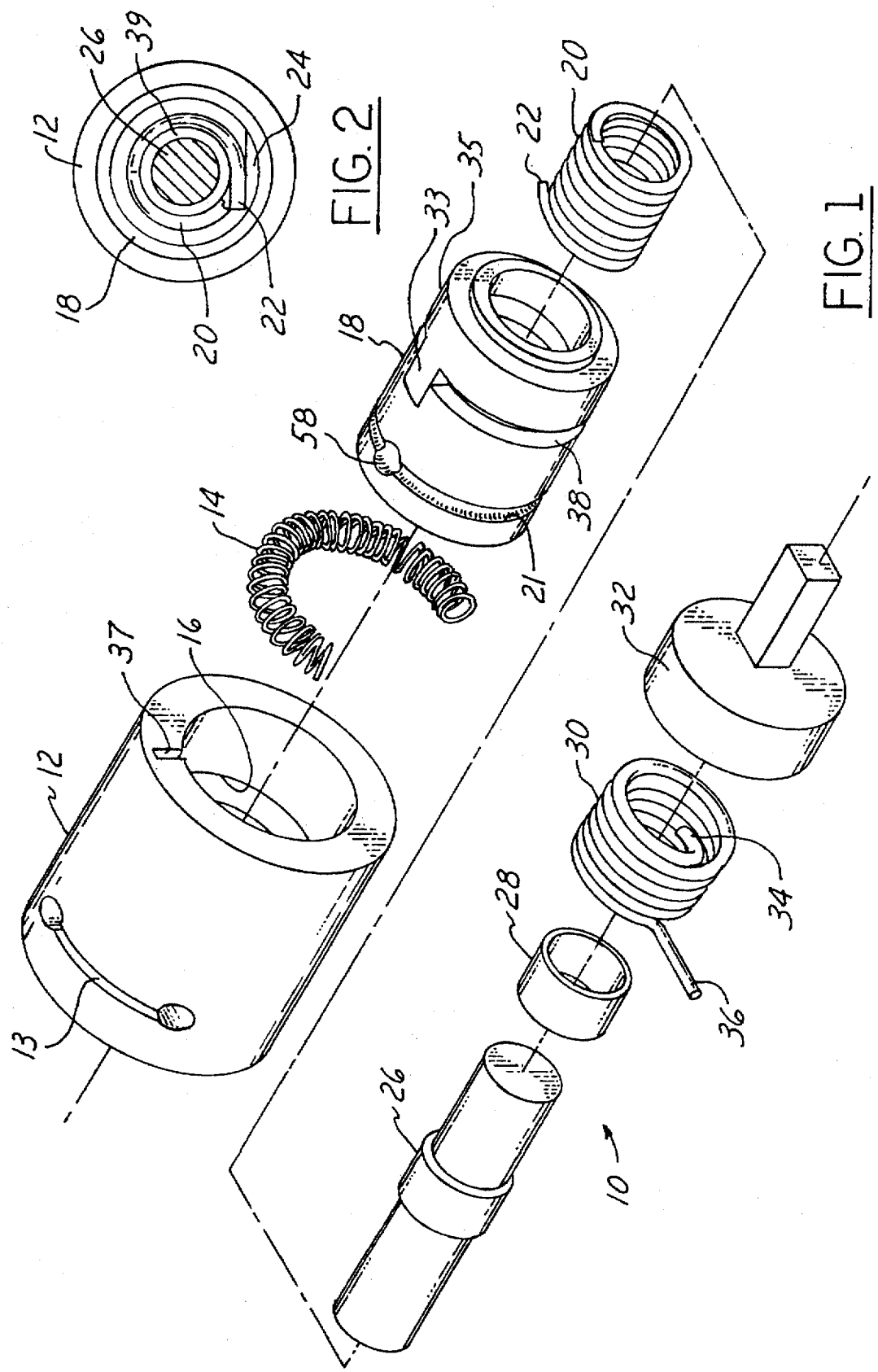

LEVER ACTUATOR

BACKGROUND OF THE INVENTION

This invention generally relates to a lever actuator that is useful in a variety of applications. One particular application for a lever actuator designed in accordance with this invention is for use in adjusting a back support within an automobile seatback, for example. A lever actuator designed in accordance with this invention provides a relatively lightweight, inexpensive and compact design for such a device.

A variety of rotary and linear actuators are used in applications requiring an adjustment of tension upon a cable, for example. Such adjustment mechanisms typically include complex gearing mechanisms and electromechanical motors. Such devices have the drawbacks of being relatively expensive, complex and susceptible to mechanical failure. Disadvantages associated with such devices include the need for frequent repair and prohibitively expensive production costs.

This invention provides a lever actuator that overcomes the shortcomings and drawbacks associated with prior devices and provides the advantageous features that are described below.

SUMMARY OF THE INVENTION

The most preferred embodiment of this invention can be described in the following general terms. This invention provides an actuator for use in applications requiring a rotational adjustment such as adjusting the length of or tension on a cable. An actuator designed in accordance with this invention includes a housing and a shaft that is fixedly mounted within the housing. A driver is rotatably disposed about the shaft. A first clutch member, which is rotationally fixedly coupled to the driver, is received about and engages a portion of the shaft such that the first clutch member and the driver are free to rotate in a first direction about the shaft but not in a second direction opposite to the first direction. A second clutch member is positioned to engage the first clutch member when the second clutch member is rotated in a second direction to thereby disengage the first clutch member from the shaft such that the driver is rotated in the second direction. The second clutch member is also positioned to engage the driver directly when the second clutch member is rotated in the first direction to thereby rotate the driver in the first direction.

In the most preferred embodiment of this invention, the clutch members are clutch springs. A further enhancement added to the most preferred embodiment includes a centering spring, which biases the driver into a neutral position. A handle is preferably coupled to the driver that can be rotationally moved from the neutral position in order to cause the second clutch member to move the driver in the first or second directions. In the most preferred embodiment, when the handle and driver return from an adjusted position to the neutral position, the driver and first clutch member remain rotationally fixed in the adjusted position about the shaft.

Further advantages and features of this invention will become apparent to those skilled in the art from the following detailed description of the preferred embodiments.

BRIEF DESCRIPTION OF THE DRAWINGS

FIG. 1 is an exploded, perspective view of a lever actuator assembly designed in accordance with this invention.

FIG. 2 is a partial cross-sectional view illustrating portions of the embodiment of FIG. 1.

DETAILED DESCRIPTION OF THE PREFERRED EMBODIMENTS

Figure 3:
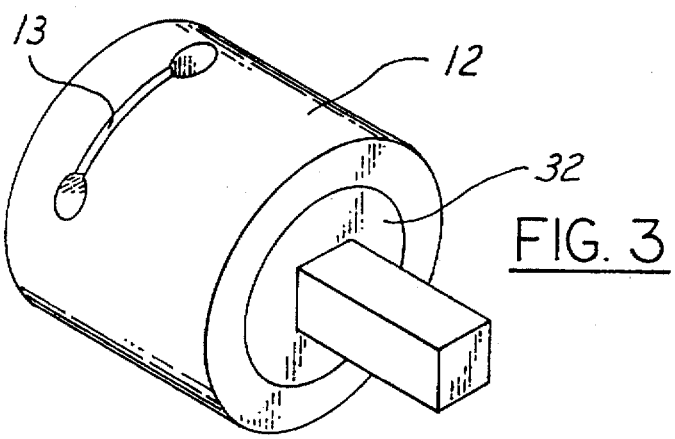
FIG. 3 is a perspective view of the assembly of FIG. 1 illustrated in an assembled form.

FIG. 1 is an exploded, perspective view of a lever actuator assembly 10 as designed in accordance with this invention. Assembly 10 includes housing 12, which can be fixedly mounted to a portion of an automobile seat for applications where lever actuator 10 will be used to adjust a back support within the seat, for example. Housing 12 has a cable access slot 13 with enlarged openings at each end. Trip spring 14 is a compression spring received within annular groove 16 inside housing 12. Trip spring 14 is maintained in a compressed condition by one or more stake pins (not shown) or other engagement surfaces within groove 16. Alternatively, trip spring 14 could be a tension spring disposed in a groove on an outside of the housing. Yet another alternative employs a pair of tension springs in associated grooves on the outside of the housing with an engagement member (not shown) connecting them. Driver 18 is received within housing 12 such that driver 18 rotates relative to housing 12. Driver 18 has a portion referred to as a cam winder in this specification, as it has a cable winding groove 21 with a cam shaped profile. Winding a cable 56 around the cam winder increases the stress within cable 56 by subjecting it to bending. Bending stress is inversely proportional to the bending radius, decreasing with an increase in radius. The cam shape is therefore selected to provide substantially constant maximum cable stress for the entire range of displacement. Constant stress makes it possible to optimize the size of the cable without risking premature fatigue failure of the cable 56. One embodiment shown has a constant diameter profile groove 21. Cable winding groove 21 is aligned with cable access slot 13 for receiving the cable 56, best seen in FIG. 7. Clutch member 20, which is a clutch spring in the illustrated embodiment, is received within a central bore in driver 18. Spring tab 22 on clutch spring 20 abuts against step 24 (as illustrated in FIG. 2) within driver 18 such that clutch member 20 and driver 18 are rotationally fixed relative to each other.

Figure 6:
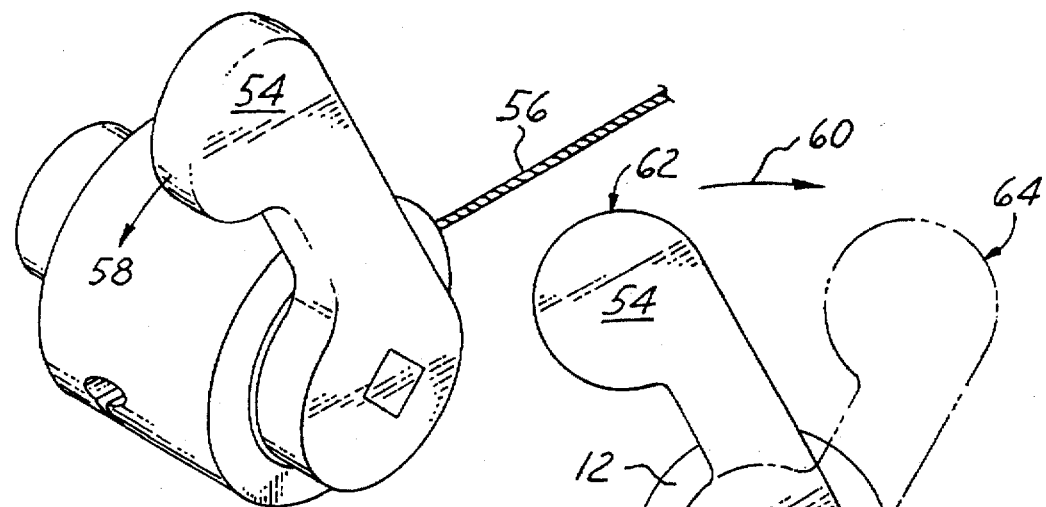
FIG. 6 is a perspective view of an assembled embodiment of this invention as would be used in an application for adjusting the length of a cable.

Shaft 26 is fixedly mounted within housing 12 such that clutch member 20 and driver 18 are received about shaft 26. Spacer 28 on shaft 26 enables clutch member 20 to rotate freely relative to shaft 26 when clutch member 30 engages clutch member 20. Engagement occurs when, as shown in FIG. 6, handle 54 is rotated in the direction of arrow 58 from a neutral position. Spacer 28 is slidably disposed on shaft 26 in the area where clutch member 30 collapses and engages. Clutch member 30 is also a clutch spring. Adapter 32 has a slot defined on a surface that faces clutch member 30 when actuator 10 is assembled. The slot (not specifically shown in the drawing) cooperates with spring tab 34 on clutch member 30 such that rotation of adapter 32 causes a simultaneous rotation of clutch member 30. Spring tab 36 on clutch member 30 is received through slot 37 in housing 12 and, when the assembly is in a completely assembled condition, tab 36 is positioned to move arcuately within annular groove 16 in housing 12. If the exterior groove and tension spring are employed as an alternative to the interior groove 16 and compression spring 14, then the tab 36 is positioned to engage the end of the tension spring. Slot 38 in driver 18 is defined by a separate end portion 35 of driver 18 with an engagement tooth 33 received by a complementary notch in a main body portion. Slot 38 receives spring tab 36 of clutch 30, with clutch 30 being disposed in end portion 35.

Figure 4:
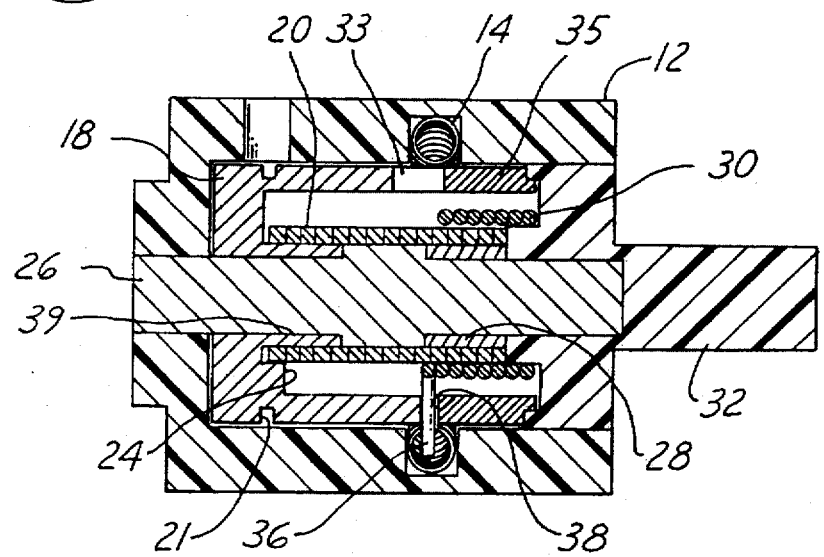
FIG. 4 is a cross-sectional view of the assembled embodiment of FIG. 3.

FIGS. 2 and 3 illustrate actuator assembly 10 in an assembled condition. FIG. 3 illustrates, in perspective view, the outside of the assembled actuator 10. FIG. 4 illustrates, in cross-sectional view, the coaxial alignment and longitudinal positioning of the various components as described above.

Although the various components of actuator assembly 10 have been described above, the most preferred method of assembling actuator 10 is described as follows.

For simplicity in description, rotations will be described in this specification as being clockwise or counter-clockwise. Arrow 58 of FIG. 6 points in the counter-clockwise direction. As will be appreciated by one skilled in the art, however, the direction of rotation could be reversed without departing from the spirit and scope of this invention.

Clutch member 20 is mounted upon hub 39 in driver 18 such that clutch member 20 cannot rotate counter-clockwise relative to driver 18. Step 24 engages spring tab 22, as described above, in order to keep clutch member 20 from rotating clockwise relative to driver 18. An interference fit is preferably provided between the interior of clutch member 20 and the exterior, or outer diameter, of hub 39. The interference fit between clutch member 20 and hub 39 keeps clutch member 20 from rotating relative to driver 18. In this manner, the clutch member 20 is rigidly, rotationally fixed to driver 18. Providing a rotationally fixed alignment between clutch member 20 and driver 18 can be accomplished in a variety of ways. For example, clutch member 20 could be placed within a pocket defined in driver 18 and spring tab 22 could fit within a cooperating slot, which would serve to keep clutch member 20 from rotating in either a clockwise or counter-clockwise direction.

Next, driver 18 is loaded onto shaft 26. An interference fit is provided between clutch member 20 and shaft 26. Because of the direction of the windings of clutch spring 20, driver 18 can rotate clockwise about shaft 26, but clutch spring 20 prevents driver 18 from rotating counter-clockwise relative to shaft 26. In an application where lever actuator 10 is utilized to wind a cable, for example to adjust a tension on the cable, clutch member 20 allows a cable to be wrapped around a spool portion defined on driver 18 by groove 21 in order to increase the tension on the cable outside of housing 12.

Engagement of clutch member 30 to adapter 32 is provided by placing spring tab 34 in the cooperating slot defined on adapter 32. Clutch member 30 is then loaded, with an interference fit, within the interior bore of driver 18. These components are then loaded into housing 12 and the completed actuator assembly appears as is shown in FIGS. 3 and 4.

Figure 5A:
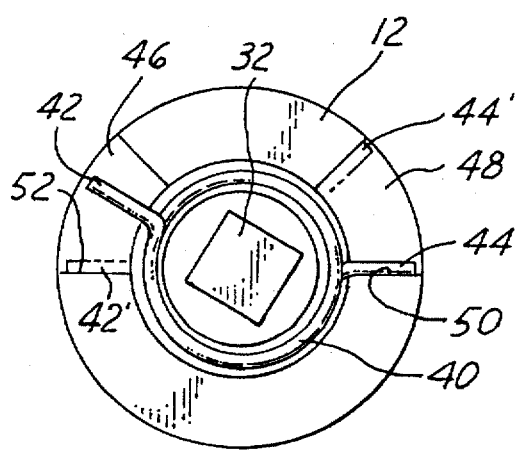
FIGS. 5A and 5B are partial cross-sectional views illustrating a feature of the most preferred embodiment of this invention.
Figure 5B:
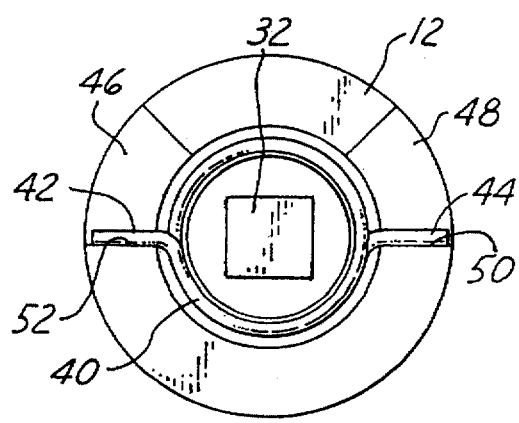

FIGS. 5A and 5B show a further enhancement in the most preferred embodiment of actuator assembly 10. Centering spring 40 is preferably provided for those applications where a centering of adapter 32 is desired. Centering spring 40 includes spring ends 42 and 44, which are received within slots or pockets 46 and 48, respectively. When the assembly is loaded into housing 12, spring end 42 is resting against shelf 52, which serves as an abutment surface relative to spring end 42. Similarly, spring end 44 is abutting against shelf 50 within slot 48. The contact between a spring end and the respective abutment surfaces places the adapter 32 into a centered, neutral position. This is illustrated in FIG. 5B.

FIG. 5A illustrates when adapter 32 is rotated in a clockwise direction. Spring end 44 remains in contact with abutment surface 50 in housing 12 while end 42 is rotated clockwise thereby torsionally compressing centering spring 40. This compression of centering spring 40 biases adapter 32 in a counter-clockwise position such that is it returned to the neutral position when the rotating force is released.

Similarly, when adapter 32 is rotated in a counter-clockwise direction, spring end 42 remains in the position illustrated in FIG. 5A at 42' while end 44 rotates upward in a counter-clockwise position to the position illustrated in phantom at 44'. Therefore, this counter-clockwise rotation torsionally compresses spring 40, which in turn biases adapter 32 back toward the neutral position (as illustrated in FIG. 5B). The advantage of providing such a centering spring in an embodiment of this invention is described in more detail below with reference to FIGS. 6 and 7.

Figure 7:
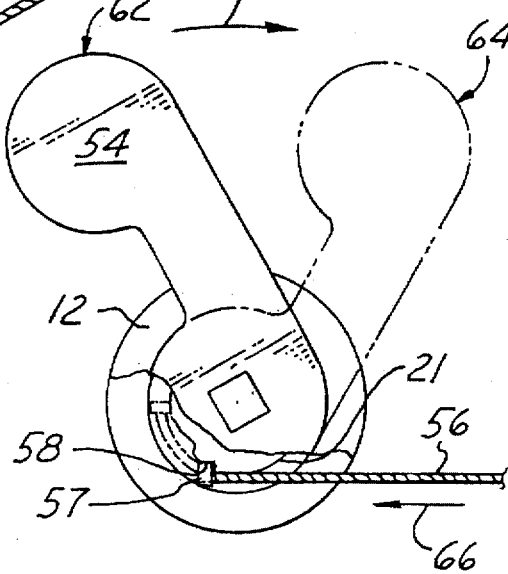
FIG. 7 is a side planar view of the embodiment of FIG. 6, illustrating an adjustment provided by that embodiment.

FIG. 6 illustrates, in perspective view, a completed actuator assembly as used in an application for adjusting the relative length of or the tension on a cable. Handle 54 is coupled with adapter 32 such that movement of handle 54 causes a rotating movement of adapter 32. Cable 56 is received within housing 12 through access slot 13 in a manner that allows a length of cable 56 to be drawn within housing 12 and wrapped around a spool portion of cam winder 18. As shown in FIG. 7, a metal slug forming cable end 57 is received by notch 58 in cable winding groove 21.

When handle 54 is rotated counter-clockwise from the neutral position shown in FIG. 6, spring end 36 of clutch member 30 contacts trip spring 14, causing clutch member 30 to collapse onto clutch member 20. When clutch member 30 collapses onto clutch member 20, handle 54 is effectively engaged to the end of clutch member 20. Therefore, any counter-clockwise rotation of handle 54 causes clutch member 20 to slip counter-clockwise relative to shaft 26. Spacer 28 sustains the collapsing load from clutch member 30 which is transferred through clutch member 20, thereby preventing clutch member 20 from engaging shaft 26. Spacer 28 rotates freely with clutch member 20 relative to shaft 26. Spring tab 22, acting against step 24, rotates driver 18 in a counter-clockwise direction, which would correspond to lengthening cable 56. Returning clockwise movement of handle 54 and adapter 32 to the neutral position of FIG. 6 causes clutch member 30 to slip relative to clutch member 20 because of continuing contact between tab 36 and spring 14, thereby having no effect on the length of the cable.

The lever type handle 54 shown in FIGS. 6 and 7 is superior to handwheels or knobs commonly used with seat adjusters in that the lever-type handle requires little or no gripping force to displace it. Handwheel controls for seat adjusters, in contrast, typically require a considerable amount of force to operate, making them nearly useless to people with a weak grip, particularly those afflicted with arthritis, or carpal tunnel syndrome.

Referring now to FIG. 7, handle 54 is illustrated in neutral position 62. When handle 54 is rotated in a clockwise direction 60 from neutral position 62 to an adjustment position illustrated in phantom at 64, the effective length of cable 56 is shortened. As can be appreciated from FIG. 7, clockwise rotation of handle 54 corresponds to winding the cable 56 about the cam winder or spool portion of driver 18 as cable 56 is drawn inward within housing 12 according to direction arrow 68 and into groove 21. When handle 54 is rotated in this clockwise direction from neutral position 62, clutch member 30 expands radially outward and engages driver 18 such that handle 54 and driver 18 are moving clockwise simultaneously. Therefore, any clockwise movement of handle 54 from neutral position 62 causes driver 18 to rotate clockwise. A clockwise rotation 18 in the illustrated embodiment, results in shortening the length of cable 56 outside of housing 12.

Any counter-clockwise movement of handle 54 from adjustment position 64 back toward neutral position 62 causes clutch member 30 to slip relative to driver 18, thereby having no effect on the adjusted length of cable 56. In other words, handle 54 can be repeatedly, or cyclically moved or pumped from neutral position 62 to adjustment position 64 in order to shorten the length of cable 56 while avoiding the possibility of unwinding cable 56. In still other words, movement of handle 54 from position 62 to 64 results in winding cable 56 about a spool portion of driver 18, yet the return of handle 54 from position 64 to position 62 has no effect on the position of driver 18, and therefore, no effect on the length of cable 56 relative to housing 12.

The pumping of handle 54 to change the length of cable 56 is made possible by the arrangement and alignment of clutch members 20 and 30 within housing 12 as described above. As will be appreciated, centering spring 40 serves the purpose of always returning handle 54 to neutral position 62 from both a clockwise position and a counter-clockwise position absent any force applied to the handle by a user.

Having described the assembly and operation of the most preferred embodiment of this invention, attention will now be turned to an alternative embodiment.

Figure 8:
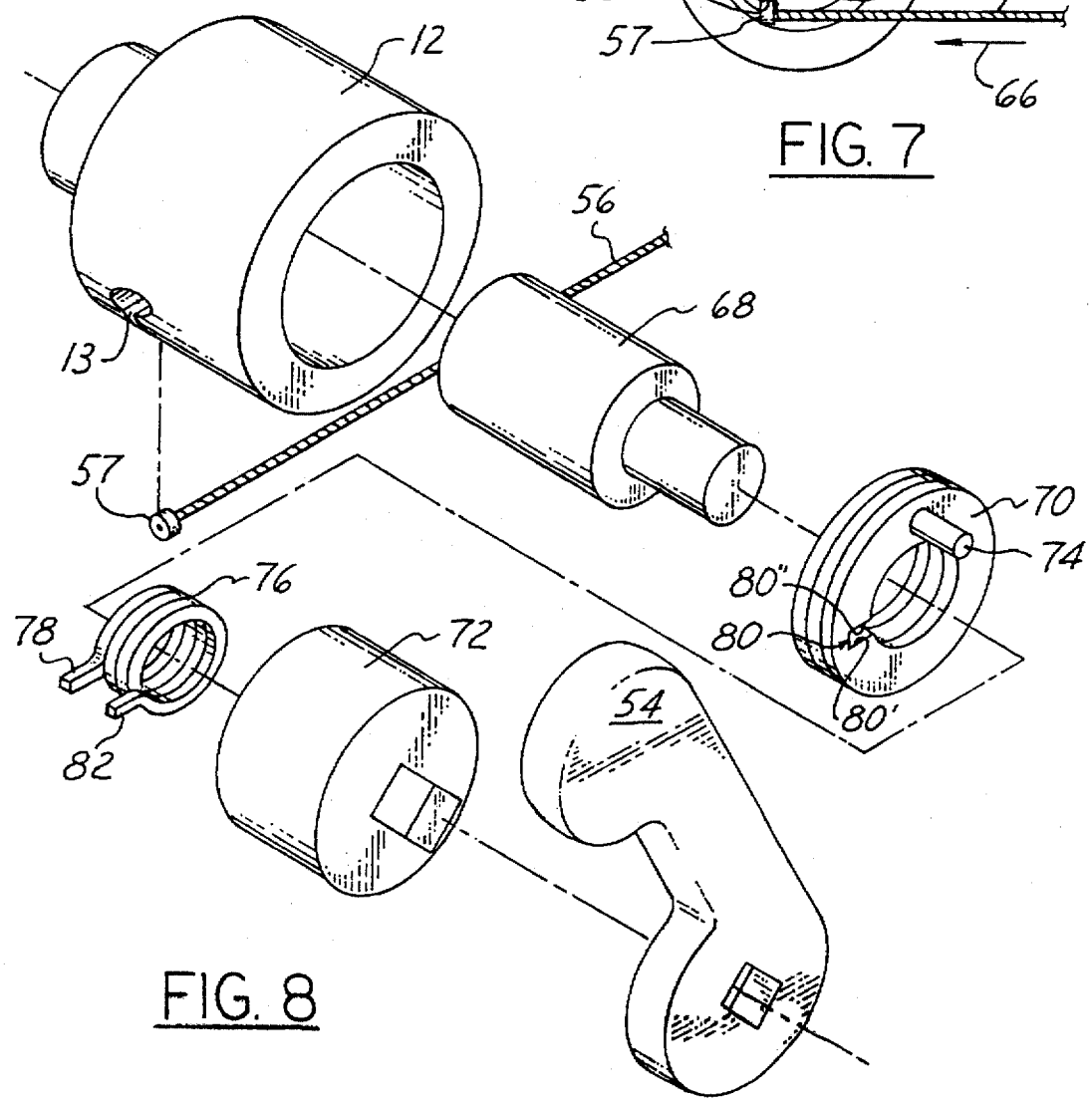
FIG. 8 is an exploded, perspective view of another embodiment of this invention.

FIG. 8 illustrates an alternative embodiment of an actuator designed in accordance with this invention. Shaft 68 corresponds to shaft 26 of the previously described embodiment. Cam winder 70, which corresponds to driver 18, is received over shaft 68 such that it freely rotates about shaft 68. Adapter 72, which corresponds to adapter 32 of the previously described embodiment, has a longitudinally defined bore (not shown) within it that receives arm 74 on cam winder 70. The bore in adapter 72 is sized to allow a small amount of relative rotative motion between adapter 72 and cam winder 70. Clutch member 76, a torsional clutch spring, is received about shaft 68 and at least partially within the central bore in cam winder 70. Clutch member 76 has an interference fit with shaft 68 and tends to remain fixed thereto. Spring tab 78 fits in and cooperates with slot 80 such that cam winder 70 moves in unison with clutch member 76. A similar slot (not shown) is provided on adapter 72 that receives and cooperates with spring tab 82 as will be described. The slots and tabs are configured so that the first contact between clutch member 76 and one of the adapter 72 and cam winder 70 with clockwise rotation of adapter 72 and cam winder 70 is between spring tab 78 and cam winder 70, and between spring tab 82 and adapter 72 with counter-clockwise rotation.

Shaft 68 is rigidly fixed into housing 12, preferably using an interference fit. Cam winder 70 is then preferably loaded onto shaft 68 with a slip fit such that it rotates freely on the shaft. Clutch member 76 is then loaded onto shaft 68 with an interference fit such that clutch member 76 normally does not rotate relative to shaft 68, absent an actuating force applied to adapter 72 through movement of handle 54.

As handle 54 and cam winder 70 are rotated clockwise, slot surface 80' on cam winder 70 pushes on the bottom of spring tab 78 (according to the drawing), thereby effectively releasing clutch member 76 from shaft 68. Therefore, cam winder 70 and adapter 72 are free to rotate in the clockwise direction. As can be appreciated from the drawing, as handle 54 is rotated clockwise, cable 56 is wound around a spool portion or groove on cam winder 70. When a rotary force is no longer applied to handle 54, slot surface 80' no longer pushes against spring tab 78 and, with the presence of the constant counter-clockwise torque provided by cable tension, surface 80" of slot 80 pushes against the top surface (according to the drawing) of tab 78, thereby collapsing clutch member 76 around shaft 68 such that the mechanism stays in a rotary stationary position.

As handle 54 and, therefore, cam winder 70, are rotated counter-clockwise, the slot in adapter 72 pushes on spring end 82 (specifically the top surface according to the drawing) effectively releasing clutch member 76 from the shaft. Therefore, cam winder 70 and adapter 72 are free to rotate in a counter-clockwise direction. As can be appreciated from the drawing, counter-clockwise rotation of handle 54 corresponds to unwinding cable 56 from about cam winder 70. Such an action corresponds to lengthening the amount of cable 56 outside of housing 12. When the rotary force is no longer applied, the slot in adapter 72 no longer pushes downward on the top surface of spring tab 82 and, therefore, clutch member 76 collapses, engaging shaft 68. Cable tension provides a constant counter-clockwise torque, which causes surface 80" within slot 80 to push on the top surface of spring tab 78, causing clutch member 76 to grip shaft 68 and resist relative rotation.

The just described embodiment of FIG. 8 is useful for many applications, however, one skilled in the art will appreciate that the previously described embodiment of FIGS. 1-7 is more versatile and advantageous for many applications. The preceding description is exemplary rather than limiting in nature. Variations and modifications of the described embodiments will become apparent to those skilled in the art that do not depart from the purview and spirit of this invention. The scope of this invention is to be limited only by the appended claims and all fair legal equivalents thereof.

What is claimed is:

1. An actuator for use in applications requiring a rotational adjustment such as adjusting the length of or tension on a cable, comprising:

a housing;

a shaft fixedly mounted in said housing;

a driver rotatably disposed about said shaft;

a first clutch member rotationally fixedly coupled to said driver, said first clutch member being received about and engaging a portion of said shaft such that said first clutch member and said driver are free to rotate in a first direction about said shaft but not in a second direction opposite to said first direction; and a second clutch member positioned to engage said first clutch member when said second clutch member is rotated in said second direction to thereby disengage said first clutch member from said shaft such that said driver is rotated in said second direction, said second clutch member being positioned to engage said driver when said second clutch member is rotated in said first direction to thereby rotate said driver in said first direction.

2. The actuator of claim 1, wherein said second clutch member is coupled to a handle such that said second clutch member rotates with said handle.

3. The actuator of claim 2, wherein said handle has a neutral rotation position relative to said housing and wherein said handle and said second clutch member are rotatable from said neutral position, in said first and second directions, along an arcuate path of a preselected length.

4. The actuator of claim 3, wherein said second member engages said first clutch member when said handle is moved in said second direction from said neutral position to an adjustment position and wherein said second clutch member does not engage said driver when said handle moves in said first direction from said adjustment position to said neutral position.

5. The actuator of claim 1, further comprising a cooperating member that cooperates with said second clutch member when said second clutch member is rotated in said second direction such that said second clutch member engages said first clutch member and thereby disengages said first clutch member from said shaft such that said driver is rotated in said second direction.

6. The actuator of claim 3, wherein said second clutch member engages said driver when said handle is moved in said first direction from said neutral position to an adjustment position and wherein said second clutch member does not engage said first clutch member when said handle moves in said second direction from said adjustment position to said neutral position.

7. The actuator of claim 3, further comprising a biasing member for biasing said handle into said neutral position.

8. The actuator of claim 7, wherein said biasing member comprises a centering spring that has one end that abuts against an abutment surface defined on said driver when said handle is rotated in one of said first or second directions and a second spring end that abuts against an abutment surface defined on said handle when said handle is rotated in the other of said first or second directions.

9. The actuator of claim 1, wherein said first clutch member comprises a clutch spring.

10. The actuator of claim 1, wherein said second clutch member comprises a clutch spring.

11. An actuator for use in applications requiring a rotational adjustment, comprising:

a housing;

a handle rotatably attached to said housing;

means for biasing said handle into a neutral position relative to said housing;

a driver adapted to cause a rotational adjustment of an item when said handle is rotated relative to said housing in a manner that causes said driver to rotate;

means for coupling said handle and said driver such that said driver is rotated to a first rotated position when said handle is rotated in a first direction from said neutral position to a first adjustment position and for maintaining said driver rotationally fixed in said first rotated position as said handle returns to said neutral position and said driver is rotated to a second rotated position when said handle is rotated in a second direction from said neutral position to a second adjustment position and for maintaining said driver rotationally fixed in said second rotated position as said handle returns to said neutral position.

12. The actuator of claim 11, wherein said coupling means comprises first and second clutch members and wherein said first clutch member is rotationally fixed relative to said driver such that said driver and said first clutch member rotate in unison, said first clutch member being free to rotate in said first direction but not in said second direction, said second clutch member engaging said first clutch member when said second clutch member is rotated in said second direction such that said driver is rotated in said second direction, said second clutch member engaging said driver when said second clutch member is rotated in said first direction to thereby rotate said driver in said first direction.

13. A lever actuator for use in applications requiring a rotational adjustment such as adjusting the length of a cable, comprising:

a housing;

a shaft fixedly mounted to said housing and substantially disposed therein;

an annular driver rotatably received about said shaft and engaged by a cable end and configured as a spool to windingly receive the cable as said driver rotates about said shaft;

an adapter rotatably mounted relative to said driver with said driver having an engagement feature restricting rotative motion between said driver and said adapter;

a clutch spring disposed directly about said shaft and disposed within said adapter and said driver and said clutch spring having a first spring end disposed within a receiving feature of said driver and the first spring end engaging said driver upon rotation of said adapter in a first rotational direction and the clutch spring having a second spring end disposed within a receiving feature of said adapter and the second spring end engaging said adapter upon rotation of said adapter in a second rotational direction; and a handle coupled to said adapter for imparting a rotational force upon said adapter by rotation of said handle relative to said housing, wherein said clutch spring engages said shaft and is rotationally fixed relative to said shaft and wherein one of said engagement of said first spring end by said driver and said engagement of said second spring end by said adapter releases said spring from said rotationally fixed engagement of said shaft.

* * * * *